United States Patent
Cheong et al.

(10) Patent No.: US 6,885,679 B1
(45) Date of Patent: Apr. 26, 2005

(54) SYSTEM AND METHOD FOR LAYER 2 FRAME DELINEATION RECOVERY

(75) Inventors: Yoon Chae Cheong, Kanata (CA); Bassam M. Hashem, Nepean (CA); Shalini S. Periyalwar, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 905 days.

(21) Appl. No.: 09/672,705

(22) Filed: Sep. 29, 2000

(51) Int. Cl.⁷ .................................................. H04J 3/16
(52) U.S. Cl. .................... 370/470; 370/208; 370/469
(58) Field of Search ........................ 370/208, 235, 370/216, 463, 388–395, 352, 470, 360, 537, 347, 346, 350–355, 252, 230–238, 466, 400, 419, 413; 455/434, 435.1, 3.05; 725/114–118, 127–123; 714/751, 795

(56) References Cited

U.S. PATENT DOCUMENTS

| | | | | |
|---|---|---|---|---|
| 5,724,352 A | * | 3/1998 | Cloonan et al. | 370/388 |
| 5,886,989 A | * | 3/1999 | Evans et al. | 370/347 |
| 6,188,699 B1 | * | 2/2001 | Lang et al. | 370/463 |
| 6,597,689 B1 | * | 7/2003 | Chiu et al. | 370/354 |
| 6,628,945 B1 | * | 9/2003 | Koorapaty et al. | 455/434 |
| 6,704,309 B1 | * | 3/2004 | Nada et al. | 370/389 |
| 6,771,673 B1 | * | 8/2004 | Baum et al. | 370/535 |
| 6,778,558 B1 | * | 8/2004 | Balachandran et al. | 370/470 |
| 6,791,944 B1 | * | 9/2004 | Demetrescu et al. | 370/235 |

FOREIGN PATENT DOCUMENTS

| | | | |
|---|---|---|---|
| EP | 0891067 | 5/1998 | H04M/3/00 |
| EP | 0942569 | 2/1999 | H04L/29/06 |

* cited by examiner

*Primary Examiner*—Chi Pham
*Assistant Examiner*—Prenell Jones

(57) ABSTRACT

Methods, receivers and transmitters all adapted to assist in the performance of layer 2 frame delineation are provided which are applicable in the context of OFDM, and also applicable to any layer 1 design facilitating high data rate transmission. Advantageously, the invention allows the identification of where a layer 2 frame begins notwithstanding the fact that the previous layer 2 header, which would normally be used to identify the location of the next layer 2 frame, has been received in error. As a consequence, rather than discarding considerable quantities of data after an erroneous header, for example all data until a super-frame boundary, layer 2 frames can be correctly received staring with the next header received in a non-erroneous layer 1 frame.

31 Claims, 7 Drawing Sheets

SYSTEM AND METHOD FOR LAYER 2 FRAME DELINEATION RECOVERY

FIELD OF THE INVENTION

The invention relates to methods and systems for layer 2 frame delineation recovery, for example for delineation recovery for MAC frames transmitted over OFDM (Orthogonal Frequency Division Multiplexing) symbols.

BACKGROUND OF THE INVENTION

In OFDM based transmission systems, the number of data bits carried by one OFDM symbol (a type of layer 1 frame) tends to be very large compared to that of conventional low speed transmission systems. For example, if one OFDM symbol consists of 1024 sub-carriers with QPSK modulation and rate one half channel encoding, and 80% capacity used for data bits, the number of data bits which would be transmitted for a single OFDM symbol would be about 100 bytes. If channel conditions allow, the number could be even as high as 800 bytes with the 256 QAM modulation scheme and near rate one coding. With these high-speed data transmission schemes, it is important to have an efficient data-packing scheme because even a fraction of the symbol that is not used for transmission could end up being several hundred bytes long.

It has become common to have variable length layer 2, or MAC frames, in order to support the bursting nature of data arrivals. It is desirable to have layer 2 frames which are capable of carrying complete upper layer transport units, for example IP packets. Thus, rather than forcing the layer 2 frame to be a fixed multiple of the layer 1 frame length, it has become common to allow the layer 2 frame to have a variable length thereby avoiding the potential wastage which would occur in the event that the layer 2 frame was a fixed size and the upper layer packet does not fit into the layer 2 frame.

In a variable length layer 2 frame, the length information is located in the header of the layer 2 frame so the receiver knows the end of the frame as well as the beginning of the next frame. Disadvantageously, when the header is in error, the receiver does not know where the next frame starts and consequently will lose data in subsequent layer 2 frames until a new layer 2 frame boundary is detected. In one effort to deal with this issue, layer 1 frames are grouped in "super-frames" for example consisting of 10 layer 1 OFDM symbols. The beginning of such a super-frame is always used to start the transmission of a new layer 2 frame. Thus if a header is in error and the receiver is unable to determine the next layer 2 frame boundary, the receiver will always know that there will definitely be a layer 2 frame boundary at the start of the next super-frame. Unfortunately, this can result in a substantial loss of data.

An example of this is shown in FIG. 1. In FIG. 1 a sequence of layer 1 OFDM symbols is indicated by 10. Two scheduling intervals 11 and 12 are shown, these being equivalent to the above referenced super-frames. A MAC frame 12 starts at the beginning of the first scheduling interval 11, and similarly a MAC frame 18 starts at the beginning of the second scheduling interval 12. Scheduling interval 11 also includes MAC frames 14 and 16 transmitted in sequence after MAC frame 12. MAC frames 12, 14 and 16 have respective headers 13, 15 and 17. Similarly, during the second scheduling interval 12, MAC frames 20, 22, 24 and 26 follow MAC frame 18, and the MAC frames 18, 20, 22, 24 and 26 have respective headers 19, 21, 23, 25 and 27.

In the event during reception over a scheduling interval 11, MAC frame 14 is received with an error in its header 15, the system is unable to determine the length of MAC frame 14 and as such does not know where the start of the next MAC frame 16 will be. For this reason the entirety of MAC frames 14 and 16 will be lost, and the receiver can only start decoding MAC frames again beginning with MAC frame 18 because it knows that a new scheduling interval 12 begins there because that is the start of a super-fame. A similar loss is shown during scheduling interval 12 in which there is shown to be an error in the header 21 of MAC frame 20 resulting in the loss of the entirety of MAC frames 20, 22, 24 and 26. In OFDM based very high data rate transmission systems, these types of loss can result in severe performance degradations since the number of data bits in one symbol is large and each header carries other sensitive control information.

Another existing method of trying to deal with this issue is to include a predetermined bit pattern as a frame start and frame end indication. Such start and end indicators may require more bits than the original header information, and are also subject to error.

SUMMARY OF THE INVENTION

The invention provides methods, receivers and transmitters all adapted to assist in the performance of layer 2 frame delineation. The invention is applicable in the context of OFDM, but is also applicable to any layer 1 design facilitating high data rate transmission. Advantageously, the invention allows the identification of where a layer 2 frame begins notwithstanding the fact that the previous layer 2 header, which would normally be used to identify the location of the next layer 2 frame, has been received in error. This means that rather than discarding a lot of data after an erroneous header, for example all data until a super-frame boundary, layer 2 frames can be correctly received starting with the next header received in a non-erroneous layer 1 frame.

The method implemented at a transmitter, provided by one broad aspect of the invention involves prior to transmitting layer 1 frames, adding layer 2 boundary information to each layer 1 frame, the layer 2 boundary information indicating whether there is a layer 2 header within the layer 1 frame and indicating where in the layer 1 frame the layer 2 header begins. The layer 2 boundary information can consist of frame delineation bits added to each layer 1 frame.

In one embodiment, the transmitter is required to align the start of each layer 2 frame with one of a number of predetermined layer 2 start positions within layer 1 frames. The boundary information is then used to indicate which one of the possible start positions is the start position of each frame.

In some embodiments, the boundary information is transmitted on dedicated OFDM sub-carriers or some other dedicated channel. In another embodiment, the boundary information is transmitted in punctured symbol locations within the layer 1 frames.

Another broad aspect provides a transmitter adapted to perform the above described transmit frame delineation functionality. More particularly, this provides layer 1 functionality adapted to, prior to transmitting layer 1 frames, add layer 2 boundary information indicating whether there is a layer 2 header within the layer 1 frame, and to indicate where in the layer 1 frame the layer 2 header begins.

According to another broad aspect, the invention provides the functionality executed by a receiver of frames transmitted using the above noted transmit functionality. The receiver receives a sequence of layer 1 frames. For each layer 1 frame received, the boundary information is extracted from the layer 1 frame indicating whether there is a layer 2 header within the layer 1 frame, and indicating where in the layer 1 frame the layer 2 header begins.

A determination is made of whether the layer 1 frame is received in error. If so, the layer 1 frames are not passed up to layer 2 until a layer 1 frame is received without error with boundary information indicating a layer 2 header is located within the layer 1 frame.

On an ongoing basis, layer 2 headers are examined to determine the location of the next layer 2 header. When the delineation procedure is required due to an error in the header, the receiver looks for a layer 2 header in a location identified by the boundary information.

Another broad aspect provides a receiver adapted to implement methods such as described above. Further aspects provide a computer usable medium containing instructions for causing processing hardware to execute the above described methods.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
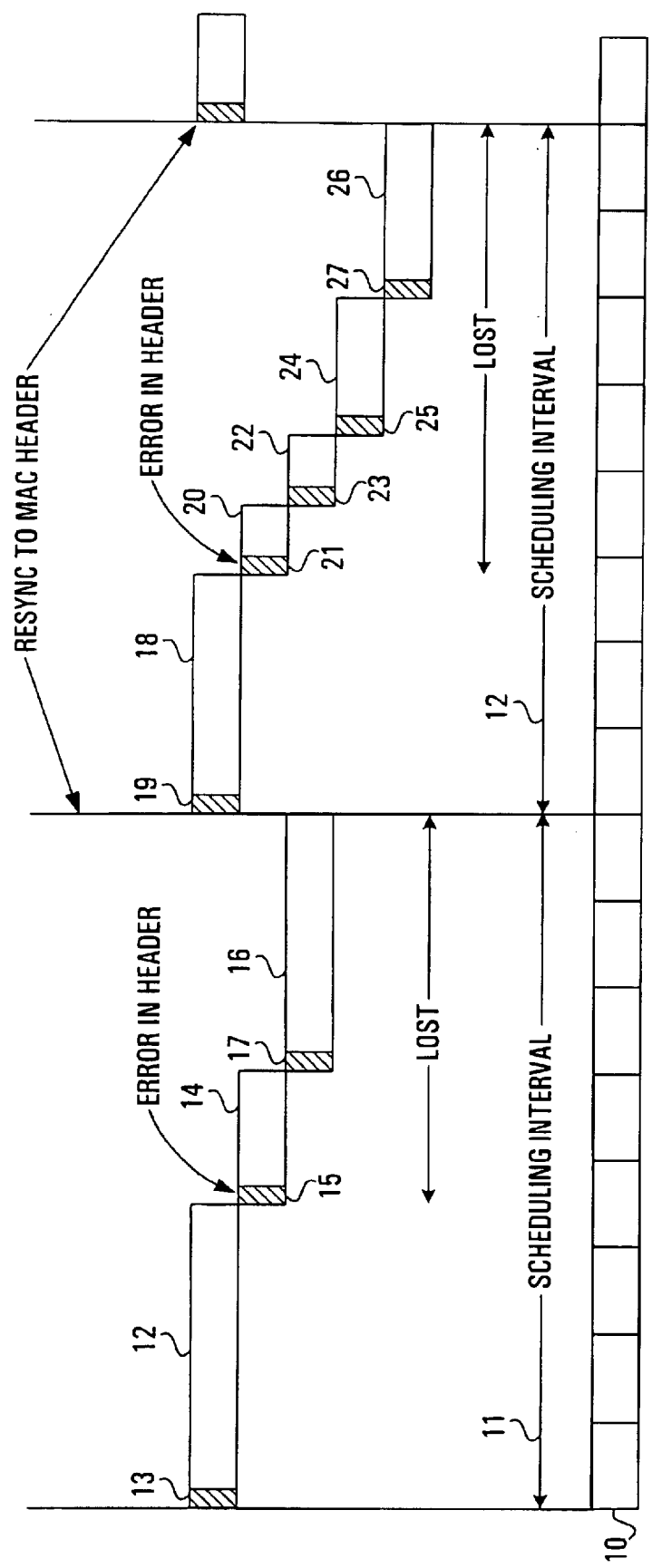
FIG. 1 is an example of layer 2 frames being transmitted over layer 1 frames in super-frames, illustrating how multiple layer 2 frames may be lost in conventional systems due to an error in a single header.
Figure 2:
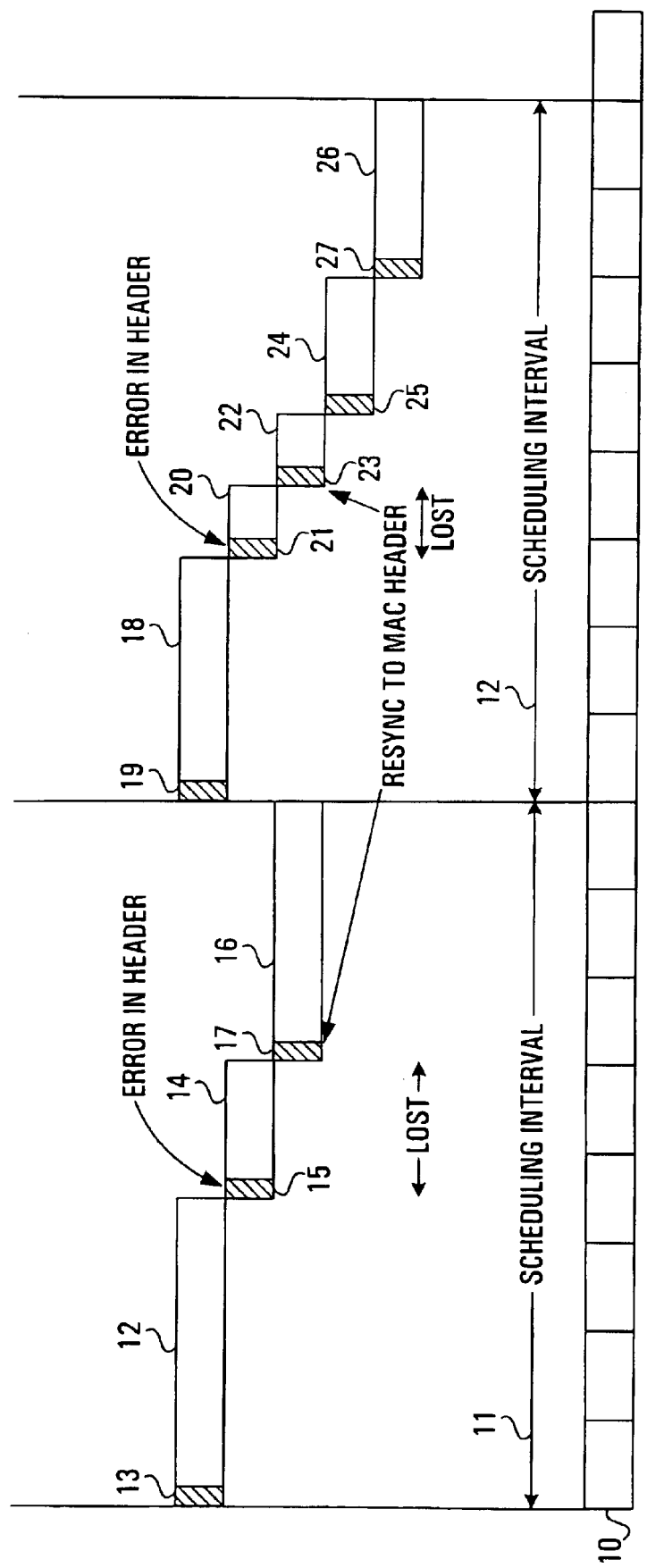
FIG. 2 shows the layer 1 and layer 2 frames of FIG. 1 to which a frame delineation recovery scheme according to the invention has been applied.

Referring now to FIG. 2, shown is the same sequence of layer 1 OFDM symbols 10 and MAC frames discussed previously with respect to FIG. 1. In this example, a frame delineation recovery method has been implemented as will be described in detail below such that notwithstanding the error in the header of 15 of packet 14, the location of the header 17 of the subsequent frame 16 can be determined, and since that OFDM symbol was not received in error that frame can be received thereby reducing the amount of lost data to consist solely of AC frame 14. Applying the same method to the subsequent scheduling interval 12 results in only MAC frame 20 being lost instead of MAC frames 20, 22, 24 and 26 as previously was the case in FIG. 1.

Figure 3:
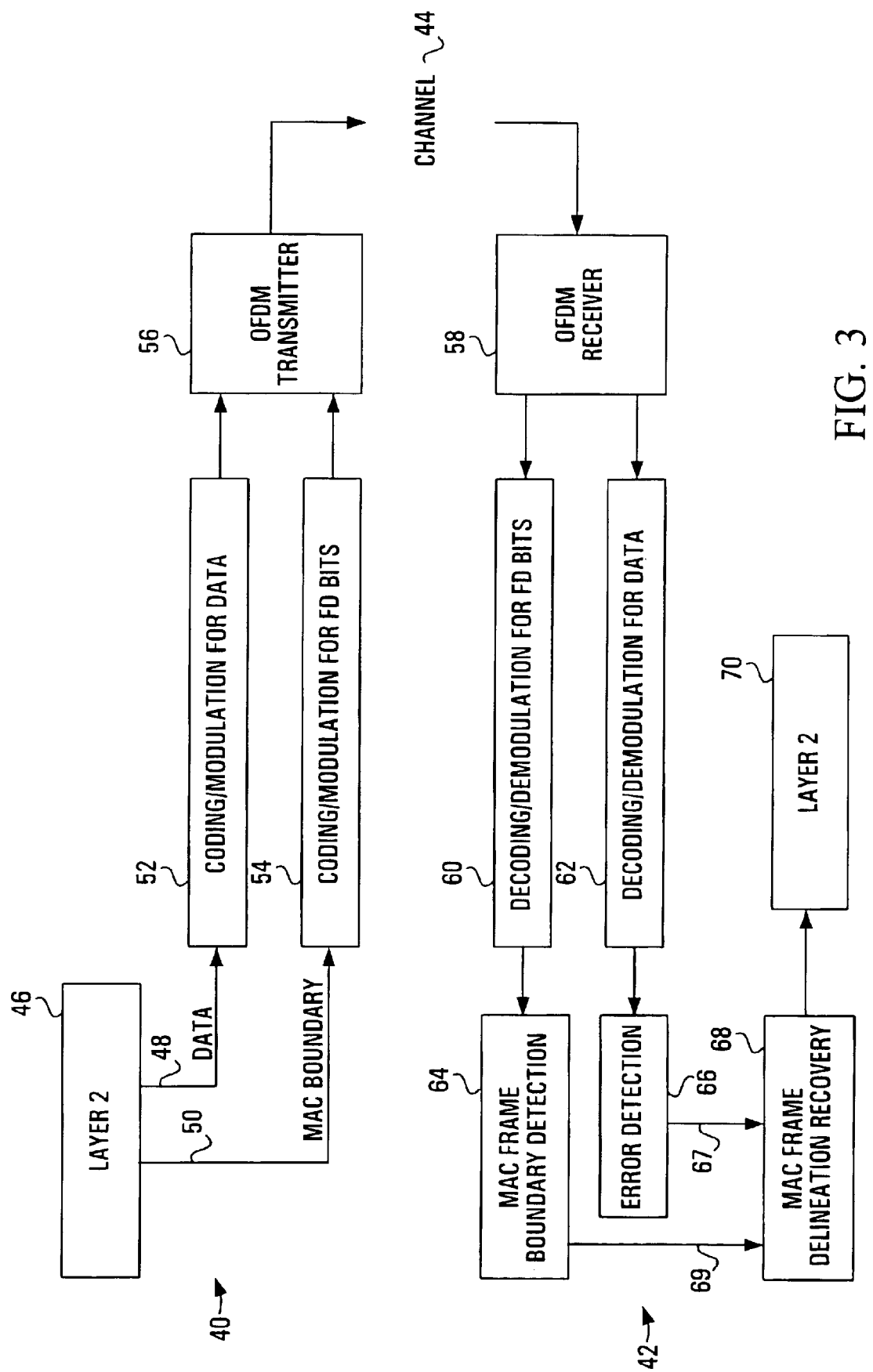
FIG. 3 is a block diagram of a receiver and transmitter adapted to perform layer 2 frame delineation according to an embodiment of the invention.

Referring now to FIG. 3, details of an example transmitter and receiver adapted to implement the frame delineation recovery will be described. Shown is transmitter functionality generally indicated by 40 connected through a wireless channel 44 to receiver functionality generally indicated by 42. Layer 2 functionality is generally indicated by 46 for the transmitter 40 and 70 for the receiver 42. The transmit layer 2 functionality 46 generates layer 2 data 48 and layer 2 boundary information 50. These are passed to respective coding/modulation blocks 52, 54. The boundary information in this embodiment will be implemented as frame delineation (FD) bits. A detailed example of the FD bits is presented below. The FD bits identify if, and where, a new MAC frame begins within the layer 1 OFDM symbol. In some embodiments, the coding and modulation applied to the frame delineation bits by coding/modulation block 54 is stronger than that applied to the data by coding/modulation block 52 such that there is a higher probability that at the receiver 42 the frame delineation bits are detected correctly. Data output by the two coding/modulation blocks 52, 54 is passed to an OFDM transmitter 56 which puts the modulated and encoded data and FD bits onto OFDM sub-carriers and transmits OFDM symbols over the channel 44. In some embodiments, the frame delineation bits are transmitted on a separate sub-carrier or sub-carriers to the data information.

The receiving functionality 42 includes an OFDM receiver 58 which receives the layer 1 OFDM symbols and passes the signals from the sub-carrier used for the frame delineation bits to a first decoding/demodulation block 60, and passes the signals from the remaining sub-carriers used for data to a second decoding/demodulation block 62. The decoding/demodulation block 60 performs decoding and demodulation on the sub-carrier containing the frame delineation bits and passes these frame delineation bits to a MAC frame boundary detection block 64. This block processes the boundary information such as frame delineation bits to determine whether or not a new MAC frame begins in that layer 1 OFDM symbol, and if so where in the symbol the new MAC frame begins. This information 69 is passed to a MAC frame delineation recovery block 68. The decoding and demodulation block 62 performs decoding and demodulation on the remaining sub-carriers and passes the data thus produced to an error detection block 66 which determines whether the symbol was received in error for example by performing a CRC check. The error detection block 66 produces an output 67 to the MAC frame delineation recovery block 68 which indicates whether or not the OFDM symbol was received in error. The MAC frame delineation recovery block 68 uses the information received from the MAC frame boundary detection block 64 and the error detection block 66 to decide either to discard the layer 1 OFDM symbol all together, or to pass it up to layer 2 functionality 70. It is noted that the error detection function can be considered a function performed between layer 1 and layer 2, a function performed at layer 1 or a function performed at layer 2. This simply depends upon where the function is implemented.

Figure 4:
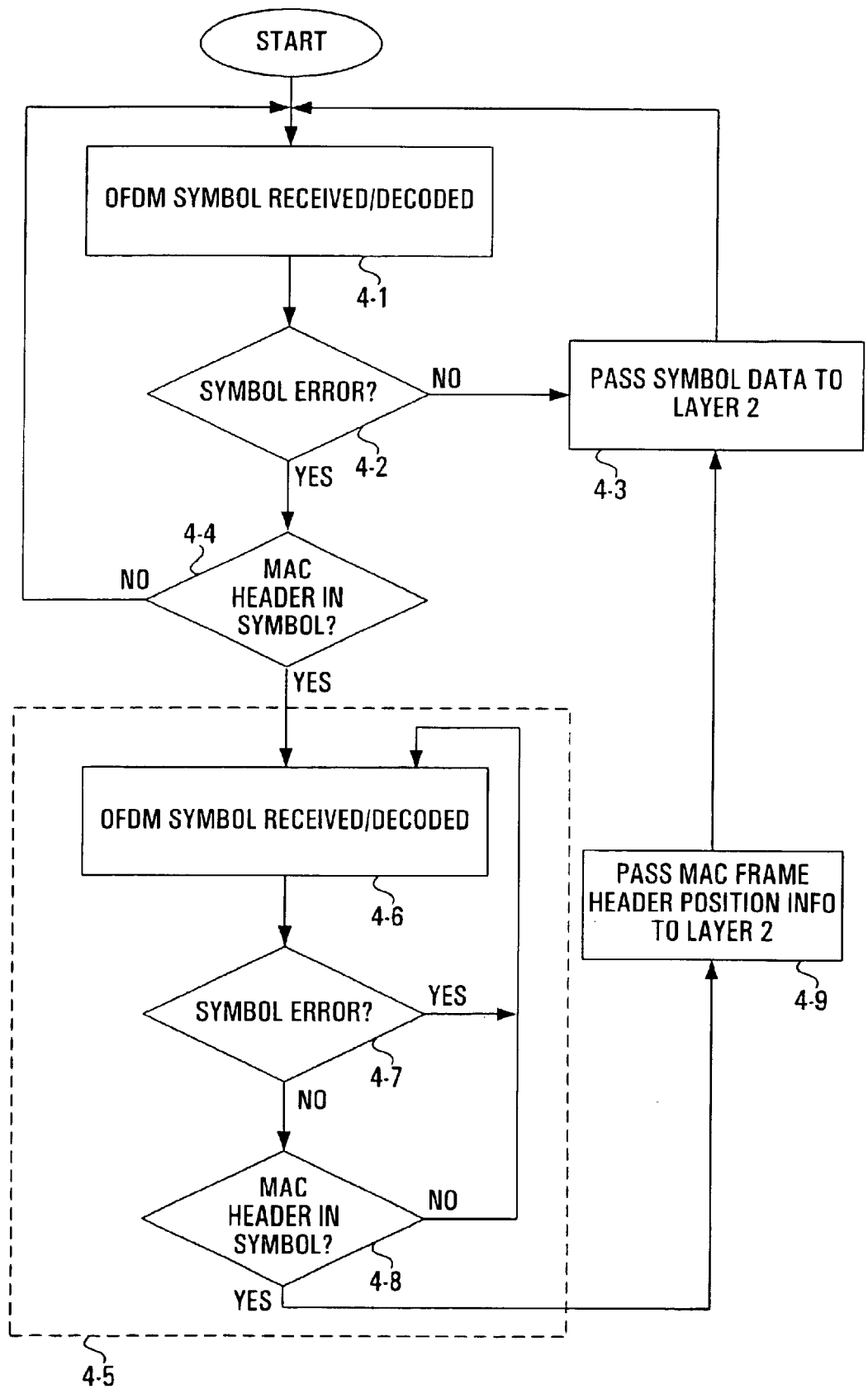
FIG. 4 is a flowchart of functionality executed by the frame delineation recovery block of FIG. 3.

The functionality implemented by the MAC frame delineation recovery block 68 will now be described with reference to FIG. 4.

The functionality begins with the receipt and decoding of a layer 1 OFDM symbol (step 4-1). The error detection block 66 produces the output 67 indicating whether or not the symbol was received in error. If the symbol was not in error (No path, step 4-2) then in step 4-3 the symbol data is passed up to layer 2 functionality 70. If on the other hand, the error detection block does indicate that the symbol was received in error (Yes path, step 4-2) then at step 4-4 if the erroneous symbol does not contain a header (no path, step 4-4, known from previously correctly decoded header) then the process returns to step 4-1 and the receipt and decoding of the next OFDM symbol. On the other hand, the frame delineation recovery step, generally indicated by step 4-5 is executed in the event the erroneous symbol did in fact contain a header. (yes path, step 4-4) Step 4-5 is a loop which is now repeated until a symbol is received which is not in error and which contains a MAC header. This begins with the receipt and decoding of a layer 1 OFDM symbol at step 4-6. In step 4-7, if that symbol was received in error (Yes path) then that is the end of that iteration of the loop and the loop continues back at step 4-6 with the receipt of another symbol. On the other hand, if the symbol was not received in error (No path) then the MAC frame boundary information received from the MAC frame boundary detection block 64 is examined to determine whether or not the symbol contains a MAC frame header. In the event there is no MAC frame header, (No path, step 4-8) then further information is still being received for a MAC frame for which the header was received in error. As such, there is no purpose for this data and that iteration of the loop ends and the process continues with the receipt of another layer 1 OFDM symbol at step 4-6. On the other hand, if the symbol does contain a MAC frame header (Yes path, step 4-8) then the MAC frame header position determined from the frame boundary information received from the MAC frame boundary detection lock 64 is passed up to layer 2 70 at step 4-9. Following this, the symbol data is also passed up to layer 2 at step 4-3. Whenever an error occurs in the symbol the entire symbol may be discarded. It is also possible that portions of the erroneous symbol may be of use and these can be passed up to layer 2.

On the transmit side 40 MAC frame boundary information 50 can be generated at any appropriate point in the processing. This can be done at layer 2 or layer 1 for example.

Figure 5:
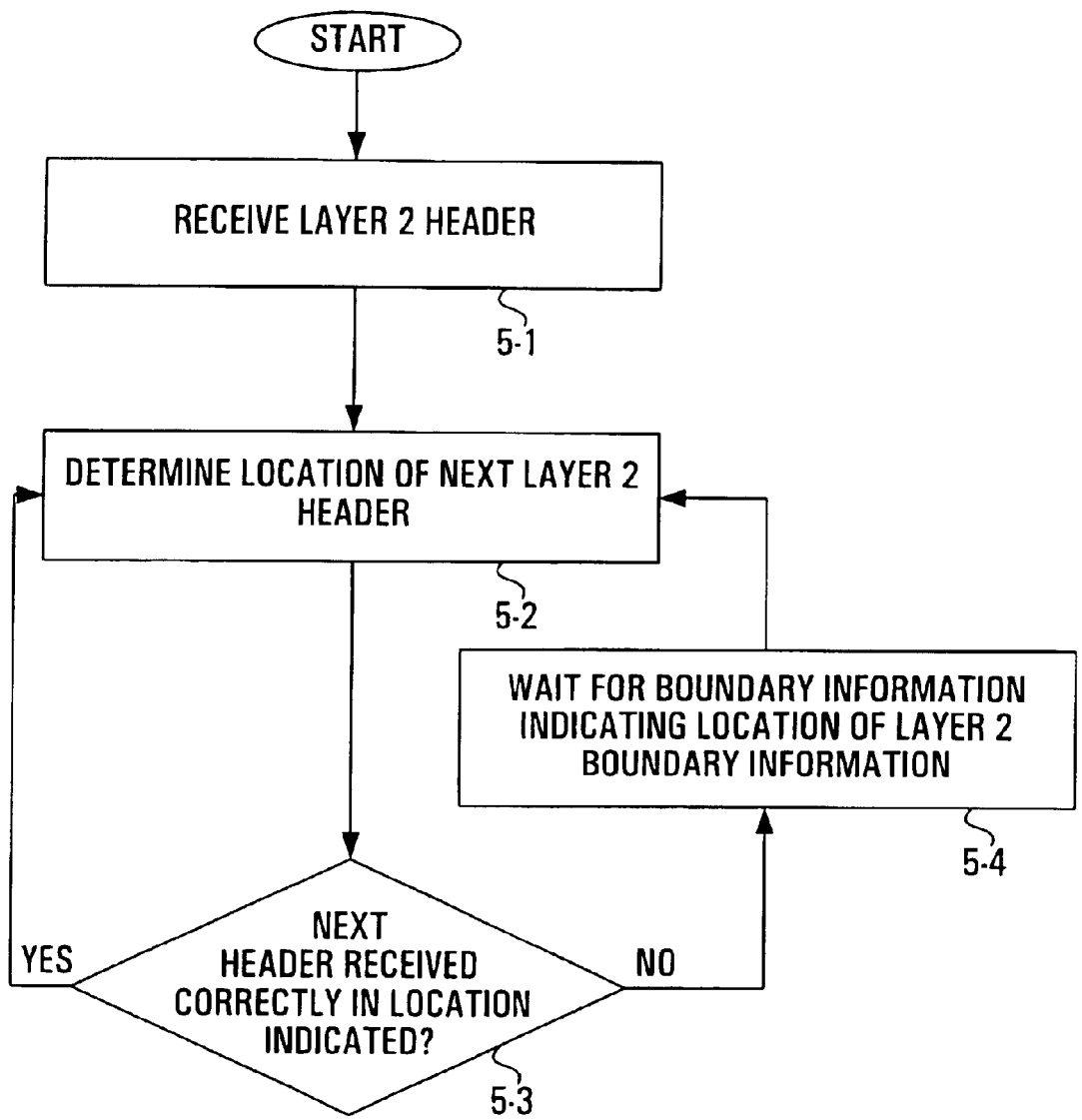
FIG. 5 is a flowchart of layer 2 header processing.

On the receive side 70 a modified layer 2 frame reception method is required. Referring now to FIG. 5, a flowchart of layer 2 frame header processing is shown. The details of processing of the data portion of the layer 2 processing are not shown as these can be implemented in any conventional manner. The method starts with layer 2 correctly receiving a layer 2 header in a known location (step 5-1) either because of a super-frame mechanism, because layer 1 indicates where it is using boundary information, or through some other start-up procedure. That header is decoded to determine the location of the header for the next layer 2 frame by examining the length field (step 5-2). Now, some time later, layer 2 will look in the expected location for the next header. If that header is correctly received (Yes path, step 5-3), then that iteration of header processing ends, and steps 5-2, 5-3 are repeated until a header is not found in the expected location (No path, step 5-3) due to layer 1 symbol in error. Then layer 2 must wait until it receives boundary information from layer 1 indicating the location of a layer 2 header (step 5-4). When such boundary information is received, the process flow returns to step 5-2 which again determines an expected location for the next layer 2 header.

Figure 6:
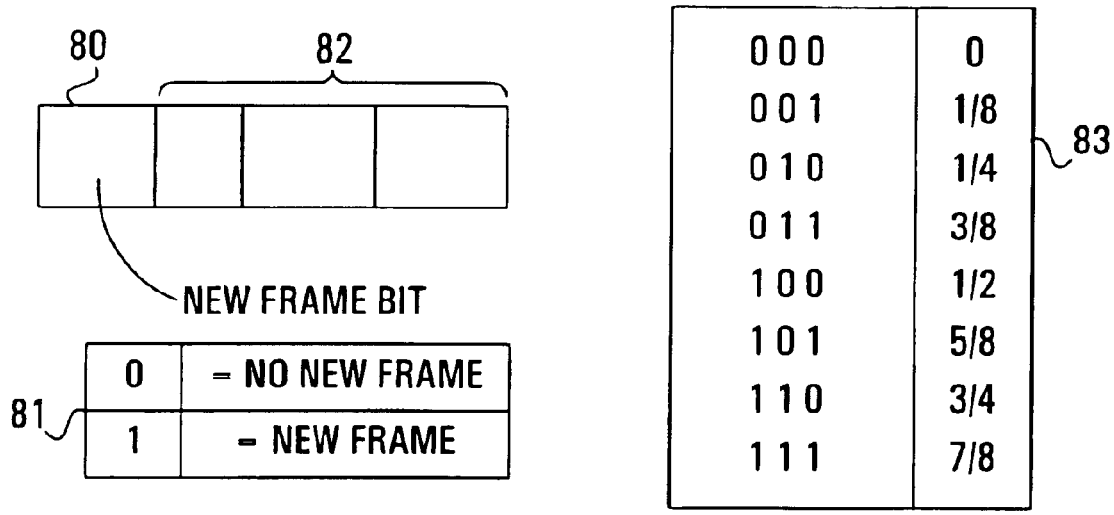
FIG. 6 shows an example format for the frame delineation bits.

An example implementation of the frame delineation bits will now be described with reference to FIG. 6. In this example it is assumed that there are four bits included in each OFDM symbol which indicate firstly whether there is a MAC frame boundary within the symbol and secondly where that MAC frame boundary occurs. Referring now to FIG. 6, the first bit 80 indicates whether the symbol contains a MAC frame boundary in accordance with the legend of Table 81. In this example, zero indicates that there is no new frame while a one indicates that there is a new frame. The following three bits 82 are used to indicate the start position of the new frame. These bits indicate to a resolution of ⅛ of an OFDM symbol the position of the frame running from 000 indicating that the frame starts right at the beginning of the symbol through to 111 indicating that the frame starts ⅞ths of the way through the symbol. This assumes that the MAC layer is constrained to start new frames only at positions which are ⅛th multiples of OFDM symbols in length.

Figure 7:
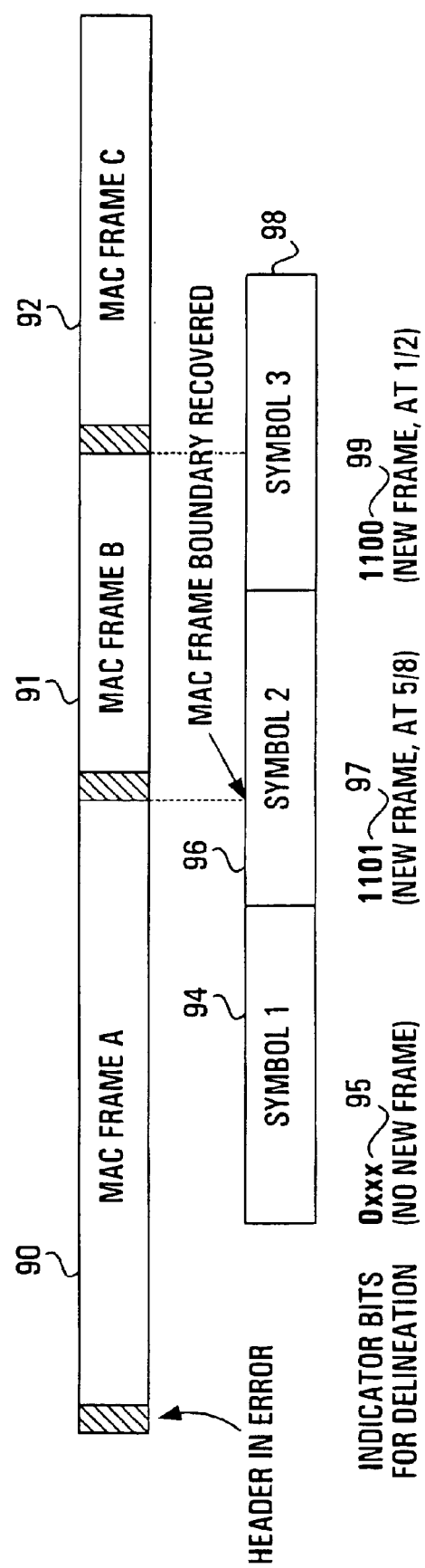
FIG. 7 is a detailed example of frames and OFDM symbols which feature the frame delineation bits in accordance with the example at FIG. 6.

Turning now to FIG. 7, a specific example in which the frame delineation bit format described with respect to FIG. 6 has been employed will now be described. In this example there are MAC frames, MAC frame A 90, MAC frame B 91, and MAC frame C 92 which are being transmitted over layer 1 symbols three of which are indicated as symbol one 94, symbol two 96 and symbol three 98. It can be seen that symbol one will contain data from MAC frame A 90 entirely, and that there is no MAC frame boundary. As such, the first bit in the frame delineation bits 95 will be a zero indicating no new frame, and the content of the remaining three bits is not relevant. Symbol two 96 on the other hand includes data from MAC frame A 90 and MAC frame B 91 and as such does include a MAC frame boundary. To indicate this the frame delineation bits 97 include a first bit which is a one indicating a new frame. Furthermore, the remaining three bits are set to "101" in this example indicating that the new MAC frame starts at a point ⅝ths of the way through the layer 1 symbol. Similarly, symbol three 98 includes data from both MAC frame B 91 and MAC frame C 92 and as such the frame delineation bits 99 include a first frame delineation bit set to one indicating that there is a new frame. The remaining three bits in this case are set to "100" indicating that the new frame begins at a point ½ of the way through the layer 1 symbol. In this example, if the header of MAC frame A 90 is received in error, OFDM symbol one is discarded, the data for MAC frame A in symbol two is discarded but it is possible to determine from the frame delineation bits in symbol two where the beginning of MAC frame B 91 is and the portion of symbol two 96 relevant to MAC frame B 91 can be extracted. The remainder of frame B is recovered from symbol three 98. What this means is that MAC frame B does not need to be retransmitted, but rather only MAC frame A 90 needs to be retransmitted. In the above example, three frame delineation bits are used to allow frame delineation to a resolution of ⅛th of an OFDM symbol boundary. Of course it is to be understood that a higher or lower granularity could be achieved by using more or fewer frame delineation bits for this purpose. For example, if the granularity level is $M=2^n$, then there are M points in the OFDM symbol where a MAC frame can begin. This is a constraint which is added to the MAC layer, namely that layer 2 frames can only start at one of a set of predetermined start positions. As indicated previously, the frame delineation bits may be encoded and modulated separately from the data traffic bits to provide more protection from channel errors. For example, the traffic data may be encoded with rate 5/6 code and modulated with 64QAM, and the frame delineation bits may be encoded with a 1/2 rate code and modulated with QPSK. A small subset of sub-carriers of OFDM symbol can be reserved for the transmission of the frame delineation bits. This reservation of sub-carriers needs to be predefined and known both at the receiver and transmitter so that the receiver can decode and demodulate them separately.

In a variable length MAC frame, the header includes information on the length of the MAC frame. The receiver extracts the length information and decides when the next frame starts. The header should be protected by an error detection code so that the length information may not be used incorrectly in case of an error in the header. When a header error is detected, the receiver looks at the frame delineation bits to find the beginning boundary of the next MAC frame. Because frame delineation bits are protected better than traffic bits, they can be correctly decoded even when the traffic bits including the frame header are in error. Therefore the probability that the next MAC frame boundary is lost will be reduced.

In the above described embodiments, it has been assumed that the layer 1 frame is an OFDM symbol. More generally, the invention can be applied to other layer 1 protocols which do not use OFDM symbols but support high data rates. Furthermore, the invention has been described with reference to the MAC layer 2 protocol. More generally, the invention is applicable to layer 2 frames which have frame boundaries which are not aligned with the layer 1 boundaries. It is noted that the method provided by the invention to provide layer 2 frame delineation may be used in combination with the super-frame method which enforces the layer 2 frames to be aligned with layer 1 frames periodically. Alternatively, the new frame delineation method can be used on its own without the need for periodic resyncing to the layer 1 frame.

In the above described embodiments, the boundary information is transmitted using dedicated OFDM subcarriers. More generally, the boundary information can be transmitted using dedicated channels of any suitable type. Alternatively, the boundary information can be transmitted in punctured symbol locations of layer 1 frames.

Embodiments of the invention can be implemented using hardware, software, or any suitable combination of hardware and software.

Numerous modifications and variations of the present invention are possible in light of the above teachings. It is therefore to be understood that within the scope of the appended claims, the invention may be practised otherwise than as specifically described herein.

We claim:

1. A method of performing layer 2 frame delineation comprising:
   prior to transmitting layer 1 frames, adding layer 2 boundary information to each layer 1 frame, the layer 2 boundary information indicating whether there is a layer 2 header within the layer 1 frame and indicating where in the layer 1 frame the layer 2 header begins.

2. A method according to claim 1 wherein the layer 2 boundary information comprises frame delineation bits added to each layer 1 frame.

3. A method according to claim 2 wherein the frame delineation bits added to a particular layer 1 frame comprise at least one bit indicating whether the particular frame contains a layer 2 header, and at least one bit indicating where the layer 2 header begins.

4. A method according to claim 1 further comprising:
   aligning a start of each layer 2 frame with one of a plurality of predetermined layer 2 start positions within layer 1 frames;
   wherein indicating where in the layer 1 frame the layer 2 header begins comprises indicating a respective one of the plurality of predetermined layer 2 start positions.

5. A method according to claim 4 wherein there are 2 predetermined layer 2 start positions, and wherein the frame delineation bits comprise n bits for indicating one of these predetermined start positions.

6. A method according to claim 1 wherein the layer 1 frames are OFDM (orthogonal frequency division multiplexing) symbols.

7. A method according to claim 6 wherein the boundary information is transmitted on dedicated OFDM sub-carriers.

8. A method according to claim 1 wherein the boundary information is transmitted on a dedicated channel.

9. A method according to claim 1 wherein the boundary information is transmitted in punctured symbol locations within the layer 1 frame.

10. A method according to claim 6 wherein the boundary information is transmitted in punctured symbol locations within the layer 1 frame.

11. A transmitter comprising:
    layer 1 functionality adapted to, prior to transmitting layer 1 frames, add layer 2 boundary information indicating whether there is a layer 2 header within the layer 1 frame, and to indicate where in the layer 1 frame the layer 2 header begins.

12. A transmitter according to claim 11 wherein the layer 2 boundary information comprises frame delineation bits added to each layer 1 frame.

13. A transmitter according to claim 12 wherein the frame delineation bits added to a particular layer 1 frame comprise at least one bit indicating whether the particular frame contains a layer 2 header, and at least one bit indicating where the layer 2 header begins.

14. A transmitter according to claim 11 further comprising:
    layer 2 functionality adapted to align a header of each layer 2 frame with one of a plurality of predetermined layer 2 start positions within layer 1 frames;
    wherein indicating where in the layer 1 frame the layer 2 header begins comprises indicating a respective one of the plurality of predetermined layer 2 start positions.

15. A transmitter according to claim 11 wherein the layer 1 frames are OFDM (orthogonal frequency division multiplexing) symbols.

16. A method of performing layer 2 frame delineation comprising:
    for each layer 1 frame of a sequence of layer 1 frames:
       receiving the layer 1 frame;
       extracting boundary information from the layer 1 frame indicating whether there is a layer 2 header within the layer 1 frame, and indicating where in the layer 1 frame the layer 2 header begins.

17. A method according to claim 16 further comprising:
    for each layer 1 frame determining if the layer 1 frame is received in error;
    wherein after receiving a layer 1 frame in error, layer 1 frames are not passed up to layer 2 until a layer 1 frame is received without error with boundary information indicating a layer 2 header is located within the layer 1 frame.

18. A method according to claim 17 further comprising:
    looking for a layer 2 header in a location identified by the boundary information.

19. A method according to claim 18 further comprising passing the boundary information up to layer 2.

20. A method according to claim 16 wherein the layer 2 boundary information comprises frame delineation bits added to each layer 1 frame.

21. A method according to claim 20 wherein the frame delineation bits added to a particular layer 1 frame comprise at least one bit indicating whether the particular frame contains a layer 2 header, and at least one bit indicating where the layer 2 frame begins.

22. A method according to claim 16 further comprising:
    looking for a layer 2 header aligned with one of a plurality of predetermined layer 2 start positions within layer 1 frames;

wherein the boundary information indicates where in the layer 1 frame the layer 2 header begins by indicating a respective one of the plurality of predetermined layer 2 start positions.

23. A method according to claim 16 wherein the layer 1 frames are OFDM (orthogonal frequency division multiplexing) symbols.

24. A receiver comprising:

layer 1 error detection function adapted to determine if a received layer 1 frame is in error, and if so to discard the received layer 1 frame;

boundary information processing function adapted to extract from each layer 1 frame boundary information indicating whether there is a layer 2 header located within the layer 1 frame and where the layer 2 header is located;

wherein after receiving a layer 1 frame in error, layer 1 frames are not passed up to layer 2 until a layer 1 frame is received without error which contains boundary information indicating a layer 2 header is located within the layer 1 frame.

25. A receiver according to claim 24 further comprising:

layer 2 functionality adapted to look for a layer 2 header in a location identified by the boundary information.

26. A receiver according to claim 25 wherein the layer 2 boundary information comprises frame delineation bits added to each layer 1 frame.

27. A receiver according to claim 26 wherein the frame delineation bits added to a particular layer 1 frame comprise at least one bit indicating whether the particular frame contains a layer 2 header, and at least one bit indicating where the layer 2 frame begins.

28. A receiver according to claim 24 further comprising:

layer 2 functionality adapted to look for a layer 2 header aligned with one of a plurality of predetermined layer 2 start positions within layer 1 frames;

wherein the boundary information indicates where in the layer 1 frame the layer 2 header begins by indicating a respective one of the plurality of predetermined layer 2 start positions.

29. A receiver according to claim 24 wherein the layer 1 frames are OFDM (orthogonal frequency division multiplexing) symbols.

30. A computer usable medium containing instructions for causing processing hardware to execute the method of claim 1.

31. A computer usable medium containing instructions for causing processing hardware to execute the method of claim 16.

* * * * *

UNITED STATES PATENT AND TRADEMARK OFFICE
CERTIFICATE OF CORRECTION

PATENT NO. : 6,885,679 B1
DATED : April 26, 2005
INVENTOR(S) : Cheong et al.

It is certified that error appears in the above-identified patent and that said Letters Patent is hereby corrected as shown below:

Column 7,
Line 61, "...there are 2 predetermined..." should read -- there are $2^n$ predetermined... --.

Signed and Sealed this

Sixteenth Day of August, 2005

JON W. DUDAS
*Director of the United States Patent and Trademark Office*